United States Patent Office 3,211,512
Patented Oct. 12, 1965

3,211,512
PARAFFIN OIL DYE ASSISTANT AND WOOL
DYEING THEREWITH
Alfred Berger, Basel, Switzerland, assignor to Ciba Limited, Basel, Switzerland, a company of Switzerland
No Drawing. Filed May 11, 1962, Ser. No. 194,196
Claims priority, application Switzerland, May 25, 1961, 6,102/61
6 Claims. (Cl. 8—18)

It has been found that when woollen yarn is dyed with complex metal compounds of monoazo dyestuffs in which one atom of chromium or cobalt is bound in complex union to two molecules of azo dyestuffs, from a neutral or weakly acidic bath with the use of assistants, more especially when the dyeing is performed in an apparatus according to the so-called suspension system, woollen yarn in hank form practically does not tend to stick together and very level dyeings can be achieved when the woollen yarn is dyed with the afore-mentioned dyestuffs, in the presence of an inert, water-insoluble organic solvent and of water-soluble salts of acid esters derived, on one hand, from polybasic acids, and on the other, from hydroxy compounds of the formula (1)
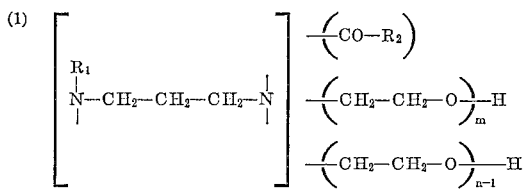

in which $R_1$ and $R_2$ each represents an aliphatic hydrocarbon radical, $R_1$ containing at least 12 and $R_2$ at least 11 carbon atoms, and $m$ and $n$ being whole numbers, and the sum $m+n$ being about 6 to 20 and preferably 9 to 13.

The dyestuffs to be used in the present process are chrominum or cobalt complexes in which one atom of metal is bound in complex union to two molecules of monoazo dyestuffs (so-called 1:2 complexes). The complexes are advantageously free from sulfonic acid groups and from carboxyl groups not participating in the complex formation. The heavy-metal atom may be bound to two identical or two different dyestuffs molecules. The complex-forming group of the dyestuffs may be, for example, an ortho-hydroxy-ortho'-aminoazo grouping, an ortho-hydroxy-ortho'-carboxy grouping or preferably an ortho:ortho'-dihydroxyazo grouping. Numerous dyestuffs of this kind, suitable for use in the present process, have become known within recent years. As is known, wool is generally dyed with these dyestuffs from a weakly acidic, for example acetic acid, to neutral bath. However, it is also possible to use complexes containing acidic solubilizing groups, for example carboxyl groups and more especially sulfonic acid groups.

The water-soluble salts of acid esters, which are used in the present process in conjunction with an inert water-insoluble organic solvent, are accessible by known methods of esterification of polyglycol compounds of the Formula 1 with polybasic acids or reactive derivatives thereof, whereby the acid esters are obtained which are then converted into water-soluble salts.

The compounds of the Formula 1 required as starting material for said operations are obtained when a monoalkyl-propylenediamine or monoalkenyl-propylenediamine of the formula (2) 
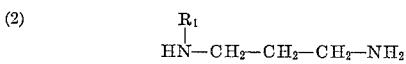

(in which $R_1$ represents an aliphatic hydrocarbon radical containing at least 12 carbon atoms) is acylated with a fatty acid containing at least 12 carbon atoms or with a functional derivative thereof, followed by an additive reaction of the resulting monoalkyl-monoacyl-propylenediamine of the formula (3)
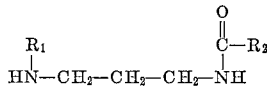

(in which $R_1$ and $R_2$ have the above meanings) with ethylene oxide in the molecular ratio of about 1:5 to about 1:19.

As examples of monoalkyl-propylenediamines or monoalkenyl-propylenediamines of the Formula 2 there may be mentioned, above all, compounds in which the hydrocarbon radical $R_1$ is unbranched and which contain no double bonds or at most one or two double bonds, and contain an even number of carbon atoms ranging from 12 to 22, that is to say propylenediamines of the Formula 2 in which the aliphatic hydrocarbon radical $R_1$ is unbranched and corresponds to the formula

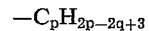

—in which $p$ is a whole even number, being at least 12 and at most 22, and $q=1$, 2 or 3—such as N-dodecyl-, N-tetradecyl-, N-hexadecyl-, N-octadecyl-, N-eicosyl-, N-docosyl-, N-octadecenyl- or N-octadecandienyl-propylenediamine, or mixtures of such N-substituted propylenediamines.

The acylation of the aforementioned diamines is carried out with fatty acids or with their functional derivatives capable of furnishing the requisite acyl radicals, such as chlorides, containing at least 12, preferably at most 22 carbon atoms. These compounds are likewise of the straight-chain variety, and contain at most one or two carbon-to-carbon double bonds and an even number, at least 12 and at most 22, of carbon atoms. As examples of such fatty acids there may be mentioned lauric, myristic, palmitic, stearic, arachic, benhenic, oleic acid and mixtures consisting wholly of substantially of such acids, such as coconut oil fatty acid and commercial searic acid.

The acylation of the compounds of the Formula 2 with the higher fatty acids can be carried out in the known manner, for example by heating a mixture of the two reactants in the molecular ratio of 1:1 in an inert, high-boiling solvent, while continuously distilling off the water formed during the reaction.

Ethylene oxide is then added on to the resulting acyl compound until at least about 5 and at most about 19 mols of ethylene oxide per mol of the acyl compound have been taken up. Particularly suitable starting materials are the polyglycol compounds obtained by adding ethylene oxide on to acylamino compounds of the composition defined above in a molecular ratio of 8:1 to 12:1.

The reaction of the acylamino compound with ethylene oxide is advantageously performed at an elevated temperature and with exclusion of atmospheric oxygen, advantageously in the presence of a suitable catalyst, for example a small amount of alkali metal, alkali metal hydroxide, alkali metal carbonate or alkali metal acetate.

Polybasic acids suitable for esterification of the polyglycol compounds are, for example, tribasic acids such as orthophosphoric acid or succinic acid-sulfonic acid, and more especially dibasic acids such as maleic, succinic, furandicarboxylic, saccharic, acetic acid-sulfonic acid or preferably sulfuric acid. In some cases it is of advantage to use for the esterification, instead of the free acids, their reactive derivatives, for example the halides or anhydrides thereof. The sulfuric acid esters, for example, are advantageously prepared with the use of chlorosulfonic acid ($Cl-SO_3H$, sulfuric acid monochloride). Of equal advantage is the use of amidosulfonic acid ($H_2N$—$SO_3H$, sulfuric acid monoamide). Phosphoric acid ester is advantageously obtained by esterification with urea phosphate. As a rule, an excess of the polybasic acid, or of its reactive derivative, is used, for example 2 to 5, preferably 2.2 to 4.4, mols of amidosulfonic acid for every mol of ethylene oxide adduct.

As reactive derivatives of the acids there may be used any compound derived therefrom that is capable of esterifying aliphatic hydroxyl groups. The esterification may be performed at temperatures ranging from 30 to 170° C., preferably from 40 to 160° C. the temperature to be used being dictated above all by the reactivity of the esterifying agent used. In many cases it is of advantage to add a suitable assistant such, for example, as urea. Esterification with chlorosulfonic acid is advantageously carried out in an anhydrous pyridine base at a temperature from 30 to 60° C., while esterification with amidosulfonic acid or urea phosphate is preferably conducted in the presence of urea, the former advantageously between 80 and 110° C. When amidosulfonic acid or urea phosphate is used as esterifying agent, the ammonium salt of the acid ester is immediately obtained, not the free acid. In other cases, for example when chlorosulfonic acid or maleic anhydride is used, the free acids are obtained and can be converted into water-soluble salts by treatment with alkalies.

Among the water-soluble salts to be used in the present process the alkali metal salts and the ammonium salt have special value. Assistants particularly suitable for use in the present process in conjunction with inert, water-insoluble, organic solvents, are, for example, the ammonium salts of acid sulfuric acid esters derived from hydroxy compounds of the above Formula 1, in which $R_1$ represents the hydrocarbon radical corresponding to soy-bean fatty acid; $R_2$—CO— is the acyl radical of oleic acid and the sum $m_1+n=9$ or 13.

According to this invention woollen yarn is dyed in the presence of water-soluble salts of acid esters of the kind defined above and simultaneously in the presence of an inert, water-insoluble, organic solvent. These additionally used assistants may be of widely different nature; as examples there may be mentioned liquid aliphatic, cycloaliphatic or aromatic hydrocarbons or mixtures of such hydrocarbons, octadecylene, also castor oil, dioctyl phthalate, pine oil and lanolin. Particularly good results are obtained when paraffin oil is used as inert, water-insoluble, organic solvent.

The proportions of the two additives, in the presence of which woollen yarn is dyed, may vary within relatively wide limits. The amount of the water-soluble salt of the acid ester may be, for example, about 0.1 to 2%, calculated from the weight of the woollen yarn; an amount of 0.5 to 1.5% has proved especially useful. The amount of inert, water-insoluble, organic solvent used may be about 2 to 100% of the amount of ester salt used, and is advantageously about 50 to 90% of the amount of ester salt.

The two afore-mentioned assistants may be added separately to the dyebath as they are, but it is preferable to add them to the dyebath in the form of a stable aqueous preparation containing suitable proportions of the water-soluble ester salt and the inert, water-insoluble, organic solvent, more especially paraffin oil, and if desired further assistants such, for example, as a dispersant or antifoam agent. Particularly suitable preparations of this kind are, for example, those which contain for every part of ester salt about 0.5 to 1 part of paraffin oil.

By the present process very level tints are obtained on woollen yarn. The present process offers special advantages in cases whereby the hitherto known methods patchy dyeings were obtained because the woollen yarn tended to stick together.

Parts and percentages in the following examples are by weight.

The number of mols shown is purely a ratio which has the sole purpose of giving direct information as to the molecular proportions in which the reactants are to be used.

Example 1

100 kg. of woolen yarn are pre-wetted in 2000 liters of water for 15 minutes at 50° C. in a hank dyeing apparatus (single-pole suspension system). There are then added 2 kg. of glacial acetic acid, 10 kg. of Glauber's salt, 3 kg. of Preparation A described below and 1 kg. of the cobalt complex of the dyestuff of the formula

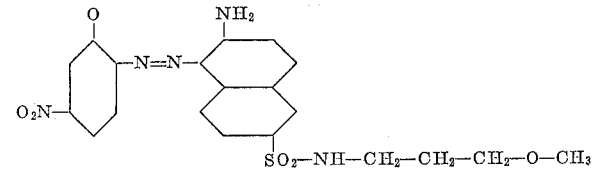

in which one atom of cobalt is bound in complex union to two molecules of monoazo dyestuff. The whole is raised to the boil within 45 minutes and dyeing at the boil is continued for one hour, whereupon the whole is cooled, rinsed cold and dried. The wool is dyed a level blue tint and displays no signs of sticking together.

Preparation A may be prepared in the following manner:

92 parts (1 mol) of a commercial propylenediamine [in which one amino group contains the hydrocarbon radical corresponding to soybean fatty acid], 70.5 parts (1 mol) of oleic acid and 0.5 part of paratoluenesulfonic acid are stirred and heated in a reaction vessel equipped with a descending condenser for 6 to 8 hours at 160 to 170° C. under a pressure of 100 mm. Hg, during which operation water passes over. Yield: 155 parts of the acylation product.

139 parts (1 mol) of the resulting product are reacted with 116 parts (12 mols) of ethylene oxide at 160 to 165° C. in the presence of 1.4 parts of sodium.

233 parts of the ethylene oxide adduct are fused with stirring at 70 to 75° C., and within about 15 minutes 44 parts of urea and then, at about 60° C. within about 30 minutes, 44 parts of amidosulfonic acid are added. The whole is then further heated and kept for 6 hours on a boiling water bath after which there are slowly added 210 parts of commercial paraffin oil which dissolves readily in the reaction product. A mixture of 100 parts of sodium dinaphthylmethane disulfonate and 5 parts of diethanolamine in 131 parts of water is then added dropwise.

After cooling to 40° C. 10 parts of an aqueous suspension of about 15% strength of an anti-foam agent based on silicone (Antifoam B, product of Dow Corning Corporation) are then added and the whole is stirred until it is homogeneous.

There are thus obtained 775 parts of a paste which contains 32 to 33% of the ammonium salt of the acid sulfuric acid ester.

Similar, good results are obtained when Preparation A is replaced by an equal amount of Preparation B described below.

Preparation B: 92 parts (1 mol) of a commercial propylenediamine [in which one amino group contains the hydrocarbon radical corresponding to soybean fatty acid], 70.5 parts (1 mol) of oleic acid, 0.7 part of paratoluenesulfonic acid and 200 parts of xylene are kept at the boil for 15 hours while passing a current of nitrogen through the mixture, during which the water formed is continuously removed with the aid of a suitable separator. The water separator then contains about 4 parts of water. The xylene is then distilled off under vacuum. The reaction vessel finally contains 156.5 parts of the acylation product.

95.5 parts (1 mol) of the resulting acylation product are reacted with 53 parts (8 mols) of ethylene oxide at 160 to 165° C. in the presence of 1.0 part of sodium.

25 parts of the ethylene oxide adduct are fused with stirring at 70 to 75° C., whereupon within about 15 minutes 5.9 parts of urea and within about 30 minutes 5.9 parts of amidosulfonic acid are added. The batch is then further heated and kept for 6 hours on a boiling water bath. 22 parts of commercial paraffin oil are then slowly added which dissolve readily in the reaction mixture.

While keeping the batch further on the boiling water bath 24.5 parts of water are dropped in and the mixture is then cooled, to yield 83 parts of a paste which contains about 33% of the ammonium salt of the acid sulfuric acid ester.

Instead of the 1:2-complex used in the above example there may be used one of the under-mentioned complex dyestuffs:

(i) The 1:2-chromium mixed complex of the monoazo dyestuffs of the formulae

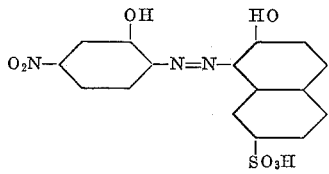

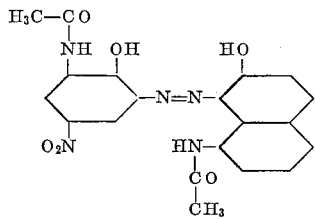

which produces greenish grey tints;

(ii) The chromium complex of the dyestuff of the formula

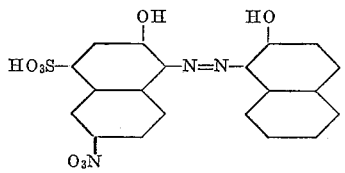

in which two molecules of monoazo dyestuff are bound in complex union to one atom of chromium, and which produces greyish black tints;

(iii) The 1:2-chromium mixed complex of the monoazo dyestuffs of the formulae

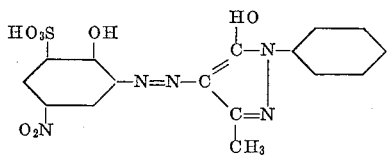

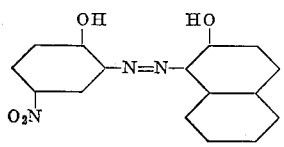

which produces reddish brown tints.

*Example 2*

180 kg. of woollen yarn in hank form are pre-wetted in 3600 liters of water for 15 minutes at 50° C. in an apparatus for dyeing woollen yarn in hank form (two-pole suspension system). There are then added 5400 grams of acetic acid of 60% strength, 9 kg. of anhydrous sodium sulfate, 1800 grams of Preparation C described below and 540 grams of the 1:2-chromium mixed complex of the monoazo dyestuffs of the formulae

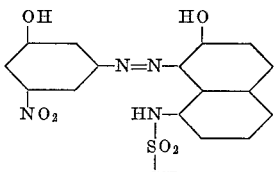

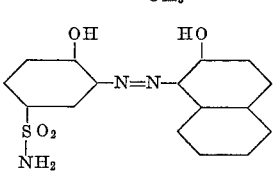

1800 g. of the chromium complex of the dyestuff of the formula

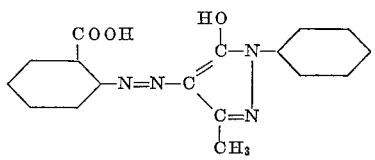

(in which two molecules of monoazo dyestuff are bound in complex union to one atom of chromium), 3060 grams of the 1:2-chromium mixed complex of the monoazo dyestuffs of the formulae

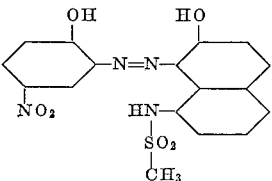

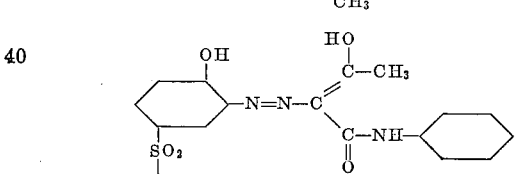

and 180 grams of the cobalt complex of the dyestuff of the formula

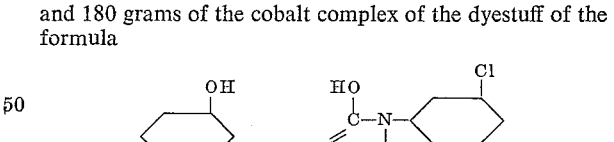

which contains two molecules of monoazo dyestuff bound in complex union to one atom of cobalt. The temperature is raised within 90 minutes to the boil and dyeing is performed at the boil for one hour. The whole is then cooled, rinsed cold and dried. The wool is dyed a very level olive-green shade and does not stick together.

Preparation C may be made as follows: 92 parts (1 mol) of a commercial propylenediamine [in which one amino group contains the hydrocarbon radical corresponding to soybean fatty acid], 70.5 parts (1 mol) of oleic acid and 0.5 part of paratoluenesulfonic acid are stirred and heated in a reaction vessel equipped with a descending condenser for 6 to 8 hours at 160 to 170° C. under a pressure of 100 mm. Hg, during which water passes over. Yield: 155 parts of acylation product (=acylation product $C_1$).

139 parts (1 mol) of the resulting acylation product $C_1$ are reacted with 97 parts (10 mols) of ethylene oxide at 160 to 165° C. in the presence of 1.4 parts of sodium to yield ethylene oxide adduct $C_2$.

214.5 parts of ethylene oxide adduct C₂ are fused at 70 to 75° C., and within about 15 minutes 44 parts of urea and then at 60° C. within about 30 minutes 44 parts of amidosulfonic acid are added. The batch is then heated for 6 hours at 92 to 95° C. 185 parts of commercial paraffin oil and 5 parts of a reaction product of 1 mol of oleyl alcohol with 6 mols of ethylene oxide are then run in and the mixture is cooled to 60° C.; at this temperature a solution of 30.5 parts of sodium dinaphthylmethane disulfonate in 40 parts of water is slowly added, whereupon 61.5 parts of sodium dinaphthylmethane disulfonate are introduced. The whole is stirred until a complete solution is obtained which is then cooled to 30 to 40° C. and mixed with 10 parts of an aqueous suspension of about 15% strength of an anti-foam agent based on silicone (Antifoam B, product of Dow Corning Corporation) and 12 parts of ethyleneglycol.

There are obtained 640 parts of a paste containing about 36% of the ammonium salt of the acid sulfuric acid ester.

Equally good results are obtained by using instead of Preparation C an equal amount of one of the Preparations D, E, F, G, H or J described below.

Preparation D: 105 parts (1 mol) of the acylation product C₁ described above are reacted with 44 parts (6 mols) of ethylene oxide at 160° C. in the presence of 1.1 parts of sodium.

17.9 parts of the resulting ethylene oxide adduct are esterified at 70° C. with 4.4 parts of urea and 4.4 parts of amidosulfonic acid, and there are then added to the hot reaction mixture 10 parts of paraffin oil and 0.5 part of a reaction product of 1 mol of oleyl alcohol with 6 mols of ethylene oxide. A solution of 5 parts of sodium dinaphthylmethane disulfonate in 10.5 parts of water is then added at 60° C., and the whole is mixed with 1 part of an aqueous suspension of about 15% strength of an antifoam agent based on silicone (Antifoam B, product of Dow Corning Corporation).

Preparation E: 95.5 parts (1 mol) of the acylation product C₁ described above are reacted with 106 parts (16 mols) of ethylene oxide at 160 to 165° C. in the presence of 1 part of sodium.

26.8 parts of the resulting ethylene oxide adduct are esterified with 4.4 parts of urea and 4.4 parts of amidosulfonic acid at 70 to 75° C. The hot reaction solution is mixed with 18 parts of commercial paraffin oil and then at 60° C. with 50 parts of water and 1 part of an aqueous suspension of 15% strength of an antifoam agent based on silicone (Antifoam B, product of Dow Corning Corporation).

Preparation F: 6.9 parts of urea phosphate and 7.8 parts of urea are fused together with stirring at 70 to 80° C., heated within one hour to 155° C. and then kept for 30 minutes at 155 to 160° C. After cooling to 110° C., 21.4 parts of the ethylene oxide adduct C₂ described above are added, and the batch is heated for 1 hour at 145–150° C., then mixed at 90 to 100° C., with 18.5 parts of paraffin oil (for example Vaseline Oil 250T, product of Esso Standard Oil Co.), cooled to 60° C., and a solution of 3 parts of sodium dinaphthylmethane disulfonate in 4.5 parts of water is slowly added, whereupon the batch is mixed with another 6 parts of sodium dinaphthylmethane disulfonate and with 1 part of an aqueous suspension of about 15% strength of anti-foam agent based on silicone (Antifoam B, product of Dow Corning Corporation).

A paste is obtained which contains about 33% of the ammonium salt of the acid phosphoric acid ester.

Preparation G: 21.4 parts of the ethylene oxide adduct C₂ described above are mixed at 70 to 75° C. with 3.9 parts of maleic anhydride which is stirred in within 30 minutes. The mixture is then heated for 30 minutes at 100° C. and for another 30 minutes at 120° C., then cooled to 80–90° C. and mixed with 18.5 parts of paraffin oil and at 60° C. with a solution of 3 parts of sodium dinaphthylmethane disulfonate in 4 parts of water. The batch is neutralized with about 4.2 parts by volume of an aqueous sodium hydroxide solution of 30% strength, and then intimately mixed with 6 parts of sodium dinaphthylmethane disulfonate, 1 part of an aqueous suspension of about 15% strength of an antifoam agent based on silicone (Antifoam B, product of Dow Corning Corporation) and 6 parts of water.

The resulting paste contains about 33% of the sodium salt of the acid maleic acid ester.

Preparation H: 88 parts (1 mol) of a commercial N-oleyl-propylenediamine, 55 parts of coconut oil fatty acid and 0.7 part of para-toluenesulfonic acid are stirred and heated in a reaction vessel equipped with a descending condenser for 6 hours at 160 to 165° C. under a pressure of 100 mm. Hg, with water passing over.

55 parts (1 mol) of the resulting acylation product are reacted with 44 parts (10 mols) of ethylene oxide at 160 to 165° C. in the presence of 0.55 part of sodium.

19.9 parts of the ethylene oxide adduct are esterified at 70° C. with 4.4 parts of urea and 4.4 parts of amidosulfonic acid, whereupon 17.5 parts of paraffin oil are added at 90 to 100° C. At 60° C. the batch is futher mixed with a solution of 3 parts of sodium dinaphthylmethane disulfonate in 4.5 parts of water, then with 6 parts of sodium dinaphthylmethane disulfonate and finally with 1 part of an aqueous suspension of about 15% strength of an anti-foam agent based on silicone (Antifoam B, product of Dow Corning Corporation).

Preparation J: 86 parts (1 mol) of a commercial N-laurylpropylenediamine, 68 parts (1 mol) of stearic acid and 0.7 part of para-toluenesulfonic acid are stirred and heated in a reaction vessel equipped with a descending condenser for 6 hours at 160 to 165° C. under a pressure of 100 mm. Hg, with water passing over.

60 parts (1 mol) of the resulting acylation product are reacted with 44 parts (10 mols) of ethylene oxide at 160 to 165° C. in the presence of 0.6 part of sodium.

20.75 parts of the ethylene oxide adduct are then esterified with 4.4 parts of amidosulfonic acid in the presence of 4.4 parts of urea, and the resulting reaction mixture is then treated at about 90° C. with 17.5 parts of paraffin oil. A solution of 3 parts of sodium dinaphthylmethane disulfonate in 6.5 parts of water is then slowly added at 60° C., followed by 6 parts of sodium dinaphthylmethane disulfonate and 1 part of an aqueous suspension of about 15% strength of an anti-foam agent based on silicone (Antifoam B, product of Dow Corning Corporation).

What is claimed is:

1. A stable aqueous dyeing assistant preparation suitable for use in dyeing woollen yarn with complex metal compounds of monoazo dyestuffs in which one atom of a heavy metal selected from chromium and cobalt is bound in complex union to two azo dyestuff molecules, from a neutral to weakly acidic dye-bath, said aqueous dyeing assistant preparation containing paraffin oil and a water-soluble salt selected from an ammonium salt and alkali metal salt of an acid ester of a polybasic acid with a hydroxy compound of the formula $$\left[ \begin{array}{c} R_1 \\ | \\ N-CH_2-CH_2-CH_2-N \\ | \end{array} \right] \begin{array}{c} -(CO-R_2) \\ -(CH_2-CH_2-O)_m-H \\ -(CH_2-CH_2-O)_{n-1}-H \end{array}$$

wherein $R_1$ and $R_2$ each represents an aliphatic hydrocarbon radical, $R_1$ containing from 12 to 22 carbon atoms and $R_2$ containing from 11 to 21 carbon atoms, and $m$ and $n$ each is a positive whole number, the sum $m+n$ being from 6 to 20.

2. A stable aqueous dyeing assistant preparation suitable for use in dyeing woollen yarn with complex metal compounds of monoazo dyestuffs in which one atom of a heavy metal selected from chromium and cobalt is bound in complex union to two azo dyestuff molecules, from a neutral to weakly acidic dye-bath, said aqueous dyeing assistant preparation containing paraffin oil and an ammonium salt of an acid sulfuric acid ester of a hydroxy compound of the formula

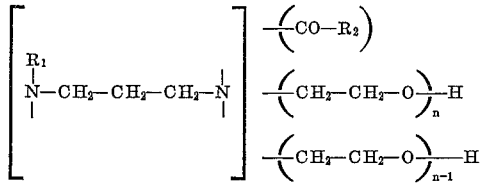

wherein $R_1$ and $R_2$ each represents an aliphatic hydrocarbon radical, $R_1$ containing from 12 to 22 carbon atoms and $R_2$ containing from 11 to 21 carbon atoms, and $m$ and $n$ each is a positive whole number, the sum $m+n$ being from 9 to 13.

3. A stable aqueous dyeing assistant preparation suitable for use in dyeing woollen yarn with complex metal compounds of monoazo dyestuffs in which one atom of a heavy metal selected from chromium and cobalt is bound in complex union to two azo dyestuff molecules, from a neutral to weakly acidic dye-bath, said aqueous dyeing assistant preparation containing paraffin oil and and an ammonium salt of an acid sulfuric acid ester of a hydroxy compound of the formula

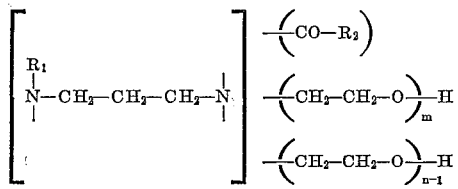

wherein $R_1$ represents the hydrocarbon radical corresponding to soy-bean fatty acid, $R_2$—CO— is the acyl radical of oleic acid and $m$ and $n$ each represents a positive whole number, the sum $m+n$ being from 9 to 13.

4. Process for dyeing woolen yarn with a dyestuff which is a complex metal compound of monoazo dyestuff in which one atom of a heavy metal selected from chromium and cobalt is bound in complex union to two azo dyestuff molecules, which process comprises applying said metal-containing dyestuff to the woolen yarn from an aqueous neutral to weakly acidic dyebath comprising said metal-containing dyestuff, paraffin oil and a water-soluble salt selected from the group consisting of ammonium and alkali metal salts of an acid ester of a polybasic acid with a hydroxy compound of the formula

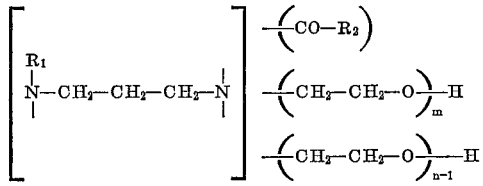

wherein $R_1$ and $R_2$ each represents an aliphatic hydrocarbon radical, $R_1$ containing from 12 to 22 carbon atoms and $R_2$ containing from 11 to 21 carbon atoms, and $m$ and $n$ each is a positive whole number, the sum $m+n$ being from 6 to 20.

5. Process for dyeing woolen yarn with a dyestuff which is a complex metal compound of monoazo dyestuff in which one atom of a heavy metal selected from chromium and cobalt is bound in complex union to two azo dyestuff molecules, which process comprises applying said metal-containing dyestuff to the woolen yarn from an aqueous neutral to weakly acidic dyebath comprising said metal-containing dyestuff, paraffin oil and an ammonium salt of an acid sulfuric acid ester of a hydroxy compound of the formula

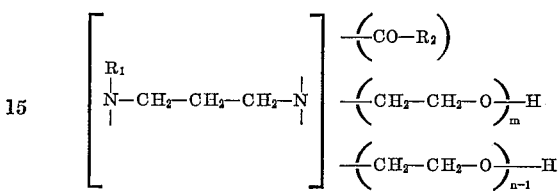

wherein $R_1$ and $R_2$ each represents an aliphatic hydrocarbon radical, $R_1$ containing from 12 to 22 carbon atoms and $R_2$ containing from 11 to 21 carbon atoms, and $m$ and $n$ each is a positive whole number, the sum $m+n$ being from 9 to 13.

6. Process for dyeing woolen yarn with a dyestuff which is a complex metal compound of monoazo dyestuff in which one atom of a heavy metal selected from chromium and cobalt is bound in complex union to two azo dyestuff molecules, which process comprises applying said metal-containing dyestuff to the woolen yarn from an aqueous neutral to weakly acidic dyebath comprising said metal-containing dyestuff, paraffin oil and an ammonium salt of an acid sulfuric acid ester of a hydroxy compound of the formula

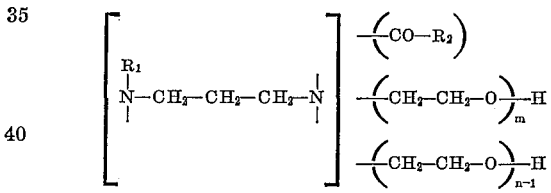

wherein $R_1$ represents the hydrocarbon radical corresponding to soy-bean fatty acid, $R_2$—CO— is the acyl radical of oleic acid and $m$ and $n$ each represents a positive whole number, the sum $m+n$ being from 9 to 13.

References Cited by the Examiner

UNITED STATES PATENTS

| | | | |
|---|---|---|---|
| 2,392,158 | 1/46 | Lacey | 8—41 |
| 2,524,041 | 10/50 | Cook | 8—43 |
| 2,763,530 | 9/56 | Shuetz | 8—43 |
| 2,828,180 | 3/58 | Sertorio | 8—62 |
| 3,006,935 | 10/61 | Albrecht | 8—43 |
| 3,043,648 | 7/62 | Hemmi | 8—93 |
| 3,049,392 | 8/62 | Casty | 8—93 |
| 3,071,427 | 1/63 | Buehler et al. | |
| 3,097,039 | 7/63 | Buehler | 8—93 |

OTHER REFERENCES

Textile Colourist, Sept. 15, 1940, pages 629–630.

NORMAN G. TORCHIN, *Primary Examiner.*

ABRAHAM H. WINKELSTEIN, *Examiner.*

UNITED STATES PATENT OFFICE
CERTIFICATE OF CORRECTION

Patent No. 3,211,512

October 12, 1965

Alfred Berger

It is hereby certified that error appears in the above numbered patent requiring correction and that the said Letters Patent should read as corrected below.

Column 9, lines 8 to 15, for that portion of the formula reading

Signed and sealed this 12th day of July 1966.

(SEAL)
Attest:

ERNEST W. SWIDER
Attesting Officer

EDWARD J. BRENNER
Commissioner of Patents